Figure 1:
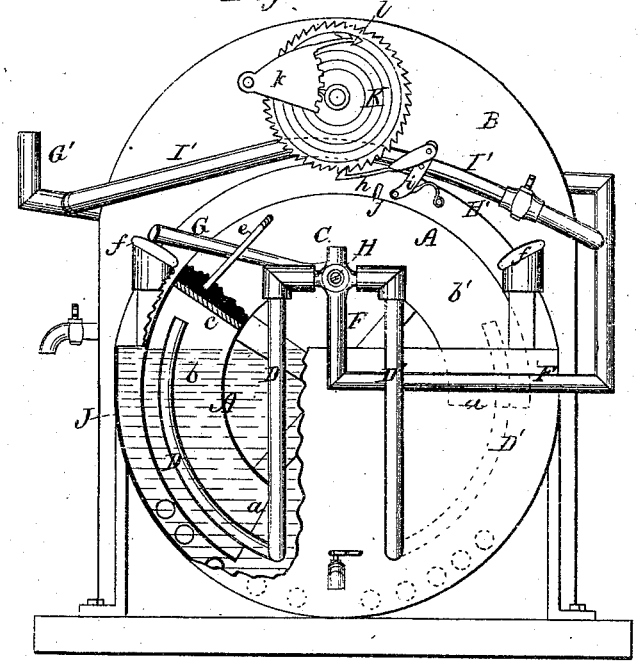

2 Sheets—Sheet 1.

J. M. CAYCE.
COMBINED GAS METER AND CARBURETOR.

No. 184,033. Patented Nov. 7, 1876.

WITNESSES:
W. W. Hollingsworth
Colon C. Kenion

INVENTOR:
Jno. M. Cayce
BY
ATTORNEYS.

J. M. CAYCE.
COMBINED GAS METER AND CARBURETOR.
No. 184,033. Patented Nov. 7, 1876.
2 Sheets—Sheet 2.
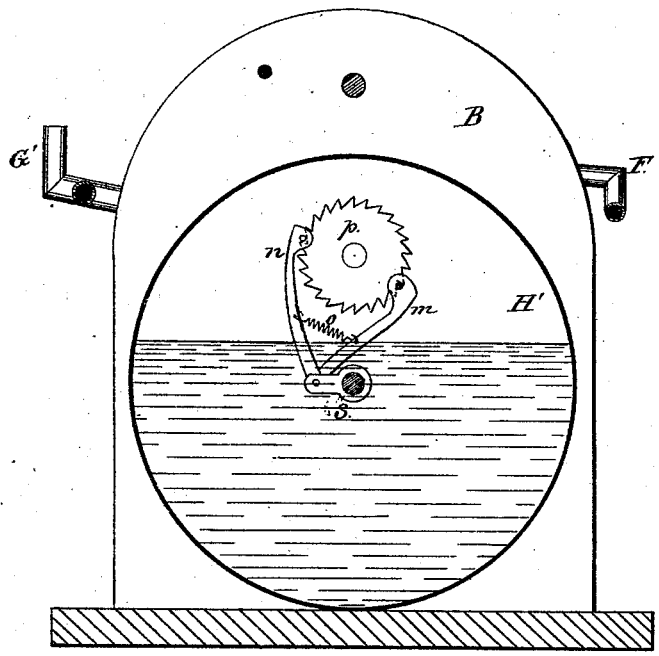
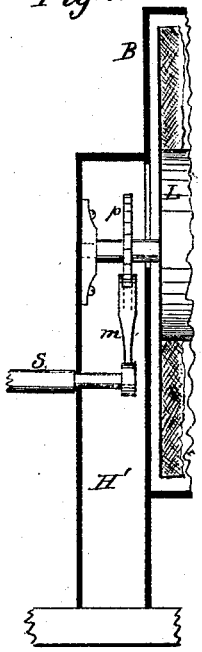
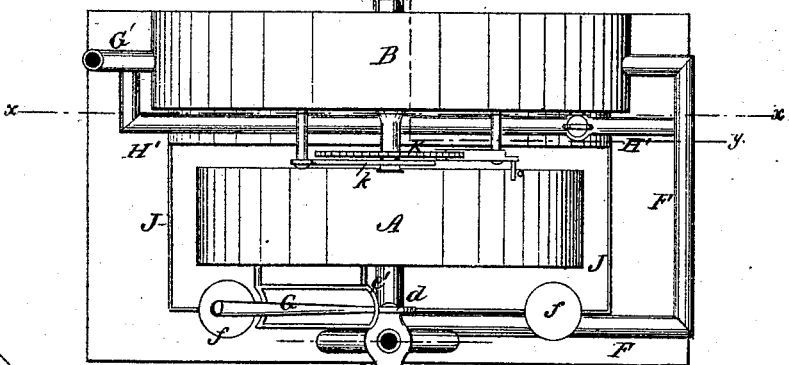
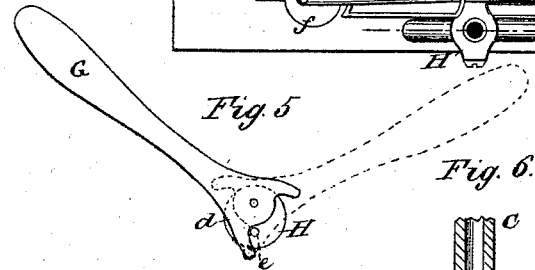
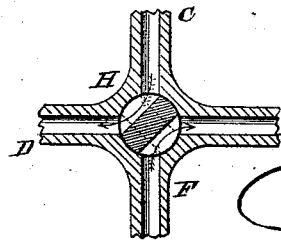
WITNESSES:
W. W. Hollingsworth
John C. Kernon
INVENTOR:
Jno. M. Cayce
BY
ATTORNEYS.

UNITED STATES PATENT OFFICE.

JOHN M. CAYCE, OF FRANKLIN, TENNESSEE, ASSIGNOR TO HIMSELF, ATHA THOMAS, CHARLES A. BAILEY, JAMES McEWEN, E. B. CAYCE, AND JOSEPH L. PARKS, OF SAME PLACE.

IMPROVEMENT IN COMBINED GAS-METERS AND CARBURETERS.

Specification forming part of Letters Patent No. 184,033, dated November 7, 1876; application filed April 17, 1876.

*To all whom it may concern:*

Be it known that I, JOHN M. CAYCE, of Franklin, in the county of Williamson and State of Tennessee, have invented a new and Improved Combined Gas-Meter and Carbureter; and I do hereby declare that the following is a full, clear, and exact description of the same.

My present invention relates, first, to an improved gas-measuring apparatus, adapted for use like other meters in dwellings and other buildings, and also for performing the function of a secondary motor for operating an air-carbureting apparatus.

The chief element of the apparatus is a bi-chambered wheel or cylinder of what may be termed annular segmental form, which is partially immersed in water or other liquid suitable for sealing its open ends, and is oscillated upon its axis by the passing current of gas required to be measured, each reciprocating movement thereof causing the vibration of a weighted lever, and thereby the reversal of a four-way cock, by which the gas current is caused to enter one chamber of the wheel while the other is discharging its contents, and vice versa, and thus in continuous alternation the gas being conveyed into and educted from the respective chambers of the wheel by the same pipes or tubes. Each complete oscillation of the wheel is registered automatically upon a dial, and since the wheel will invariably oscillate by the same pressure and volume of gas, the measurement is entirely accurate and reliable.

When the meter is combined with the air-carbureter the operation is similar, air being driven through the wheel, and thence into the carbureter proper by means of a suitable blower. The carbureter consists of a rotating cylinder provided with radial arms covered with absorbent fibrous material, by contact with which the air takes up the carbon of the gasoline or other volatile hydrocarbon, in which the cylinder is partly immersed. The latter is rotated by a suitable pawl-and-ratchet connection with the meter-wheel, so that their movements always correspond, whether the volume of air driven through the meter in a given time be greater or less, and hence the air is always carbureted equally, and the illuminating property thereby conferred is rendered as stable and uniform as practicable.

Figure 2:
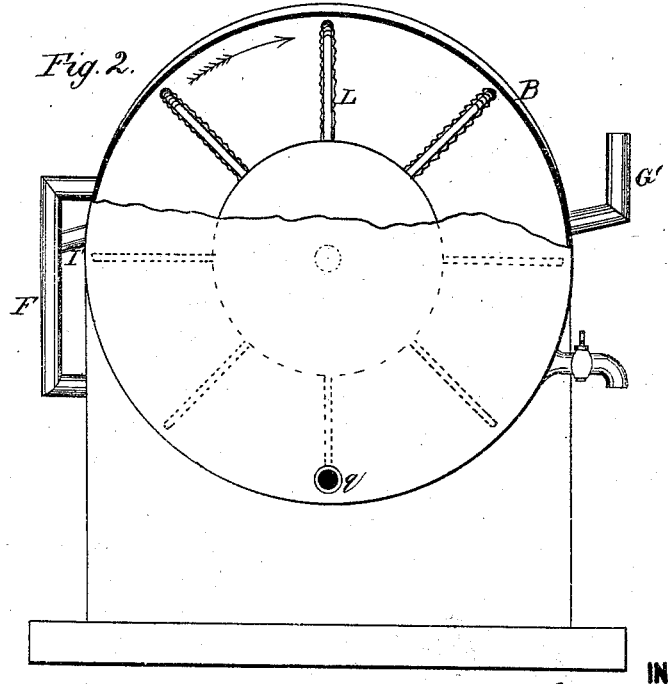

In the accompanying drawing, forming part of this specification, Figure 1 is a front elevation of the apparatus, part of the meter-wheel and its tank being broken away to show the interior construction. Fig. 2 is a vertical rear elevation of the carbureter, with part of the case broken away to show the construction of the wheel. Fig. 3 is a vertical section on the line $x\ x$ of Fig. 4. Fig. 4 is a plan view. Fig. 5 is a detail view, showing in full and dotted lines the respective positions of the lever by which the four-way cock is operated. Fig. 6 is a detail sectional view, showing, respectively, in full and dotted lines the two positions assumed by the four-way cock. Fig. 7 is a detail cross-section on line $y\ y$, Fig. 4, showing the connection between the axis of the meter and carbureter wheels and the chamber between them.

In the said drawing, A indicates the meter-wheel; B, the carbureting-wheel; C D, the pipes through which gas or air is supplied to the meter-wheel; F, the pipe which conducts the same to the burner or to carbureter, as the case may be; and G the vibrating lever, by which the four-way cock H is reversed.

I will first describe the meter. The wheel A has an annular segmental form, is open at each end $a$, and divided into two equal parts or chambers, $b\ b'$, by means of a radial partition, $c$. The wheel is immersed in water to a point above its axis, and the curved ends of the stationary pipes D D' extend up into the respective chambers $b\ b'$ above the water-line. These pipes pass out through the side of the tank J, and form a junction with the supply-pipe C and eduction or distributing pipe F, as shown in Fig. 1. A four-way cock, H, controls the direction of the gas in respect to both entering and discharging from the wheel. The same is operated by a lever, the broad head $d$ of which is pivoted eccentrically to the head of the plug H, and provided with notches which allow the lever to vibrate through the fourth part, or thereabout, of a circle before striking a pin, $e$, fixed in the plug H. The latter is, therefore, not reversed in position until the lever has nearly completed its vibration. The lever works in a guard or keeper, $e'$, attached to the side of the wheel, and when the latter oscillates in either direction it raises the lever from the inclined position shown in Fig. 1, and as soon as it reaches a vertical, it falls in the opposite direction by its own gravity, and is arrested by an elastic buffer, $f$. Thus the oscillation of the wheel, which depends upon the alternating pressure of the gas in its respective chambers, causes the vibration of the lever G, which, in turn, reverses the cock H, and controls the induction and eduction of the gas. The particular construction and arrangement whereby the reversal of the cock in position effects this result will be readily apparent from Fig. 6, in which the cock is shown in position to allow the passage of gas from supply-pipe C directly into pipe D, which leads into the left-hand chamber of the wheel, and from pipe D′ into distributing-pipe F. In other words, the cock is in position to allow the gas to fill the left-hand chamber $b$ of the wheel, and discharge gas from the right-hand chamber $b'$. When the vibration of lever G turns the cock to the position shown in dotted lines, Fig. 6, the reverse operation takes place, the gas entering the right-hand chamber $b'$ through pipes C D′, and the left-hand chamber discharging through pipes D F. In this manner the oscillating movements of wheel, lever, and cock go on continuously so long as there is sufficient pressure of gas in the main to exert the required leverage, as between the body of water within each wheel-chamber and the fixed partition of the easily-movable wheel.

The cubical capacity of the chambers $b$ $b'$ being accurately ascertained, and the oscillation of the wheel being always controlled within defined limits, it follows that a definite and known quantity of gas will be measured each time a chamber is filled and discharged. To record the quantity passed through the meter in any given period of time, it is, therefore, only requisite to register the number of oscillations of the wheel in that time. If, then, the two chambers of the wheel have an aggregate capacity of one hundred cubic feet, it is obvious that ten thousand cubic feet of gas will pass through the wheel in one hundred vibrations. To register the vibrations on this scale or basis, a disk or dial, K, Fig. 1, having one hundred notches, may be employed. The disk is rotated intermittently by means of a hook-pawl, $h$, operated by a pivoted spring-lever, $i$, with which a tappet, $j$, on the periphery of wheel A, comes in contact at each complete oscillation. The toothed disk is hence moved one notch at each oscillation, and since each notch indicates one hundred cubic feet of gas have passed through the meter, the comple rotation of the disk indicates ten thousand feet. To provide for registration beyond this point I employ a toothed segment, $k$, pivoted upon a fixed arm or bracket contiguous to the edge of the disk, and provided with an index or pointer, $l$. The toothed segment is moved intermittently by a tappet on the axis of the notched disk, and, the latter being marked off in concentric numbered circles, the index is always made to point to the circle which indicates number of complete rotations made by the disk.

I have thus described the construction and operation of the metric apparatus and its registering attachment, as employed for measuring gas and indicating the quantity consumed. The apparatus is designed as an improved substitute for use wherever the common dry or wet meters are employed. I show this meter connected with the carbureter B, in which connection it becomes an engine or motor for the carbureting-wheel L, the primary agent for effecting the oscillation of the wheel being in such case the air which is fed into and passed through the carbureter, to be subsequently consumed as an inflammable gas. The construction and operation of the meter in this relation are precisely the same as previously described, the only change otherwise being the substitution of atmospheric air for illuminating-gas, and the junction of the pipe F with the case of the carbureter in place of connection with the pipe or pipes leading directly to the burners. The air is thus forced through pipe F into the space above the carbureting-wheel, and rapidly takes up the carbon element from the gasoline in which the wheel is partly submerged, and finally escapes through the pipe G′ and passes to the burners, to be consumed.

The wheel L is connected with the meter-wheel A by push and hook pawls $m$ $n$, which are pivoted together on a crank affixed to the axis of the wheel A, and held engaged by a spiral spring, $o$, with a ratchet, $p$, on the axis of wheel, Fig. 3. Hence the oscillation of wheel A causes the rotation of wheel L. It is essential the wheels A shall oscillate with the least possible friction, and also that there shall be no means of communication between their respective chambers. I hence provide a narrow vertical chamber, H′, Figs. 4 and 7, between the meter-tank J and case B of the carbureter. The water which nearly fills tank J finds entrance to this chamber around the axis of wheel A, and stands always at the same height in both. It therefore not only lubricates the bearing of wheel A, but effectually seals that passage into chamber H′. The upper portion of said chamber above the water is always filled with gas, which enters around the axis of wheel L. From this arrangement it is obvious no packing is requisite for the bearings of the respective wheels, and friction is reduced to a minimum.

When the gas is too highly carbureted a part of the air passed through the meter-wheel may be diverted from the carbureter and passed directly into the distributing-pipe by means of the pipe I', which is provided with a suitable stop-cock for the purpose.

The carbureter will be supplied with hydrocarbon from a tank of suitable size connected therewith at $q$, Figs. 2 and 4.

What I claim is—

1. A partially-submerged oscillating meter-wheel, having the form of a segment or divided annulus, divided into two open chambers, and induction and eduction pipes leading into said chambers, combined substantially as shown and described.

2. The combination, with the oscillating meter-wheel, and induction, eduction, service, and distributing pipes, of the cock H, vibrating lever and keeper, as shown and described.

3. The combination of the elastic stops or buffers $f$ with the vibrating lever G, as shown and described.

4. The combination, with the four-way cock H and several pipes, C D D' F, of the vibrating lever, pivoted eccentrically to adapt it to act on the pin $e$, and thereby reverse the position of the cock, as shown and described.

5. The combination, with a rotating carbureting-wheel, L, of the meter-wheel A, air-conducting pipes, and connecting mechanism, substantially as shown and described, whereby the air supplied to the carbureter first operates the meter-wheel, and the reciprocating movement of the latter imparts rotary motion to the carbureter-wheel, as specified.

JOHN M. CAYCE.

Witnesses:
AMOS W. HART,
T. J. W. ROBERTSON.